March 27, 1928.  1,664,281

J. F. BAINE

DEVICE FOR LOCATING AND RAISING SUNKEN VESSELS

Filed April 17, 1926

INVENTOR
J. F. Baine
BY J. Edward Maybee
ATTY

Patented Mar. 27, 1928.

1,664,281

UNITED STATES PATENT OFFICE.

JOHN FERGUSON BAINE, OF NORTH BAY, ONTARIO, CANADA.

DEVICE FOR LOCATING AND RAISING SUNKEN VESSELS.

Application filed April 17, 1926. Serial No. 102,710.

This invention relates to devices adapted to be permanently carried on vessels and released automatically, or manually, to indicate the position of a vessel in the event of its sinking and my object is to devise a simple and reliable device for this purpose which will facilitate the engagement with the sunken vessel of cables whereby it may be raised.

I attain my object by providing a buoy connected with one end of a line wound on a drum carried by the vessel. The buoy is preferably carried in such a manner that it will automatically disengage from the vessel after the latter is submerged and float to the surface, the line unwinding as the vessel sinks. The line is led through a guide provided with an arm or arms engageable by a ring slid down the buoy line and connected to a heavy cable to form an attachment to the vessel whereby it may be raised.

Figure 1:
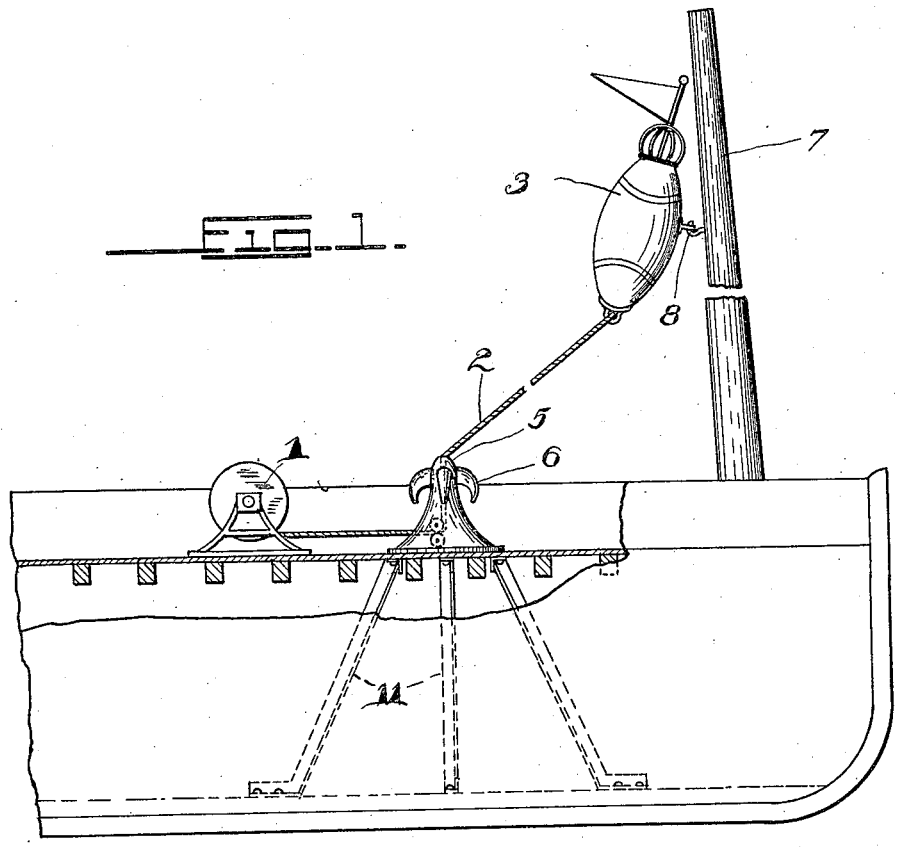
Figure 2:
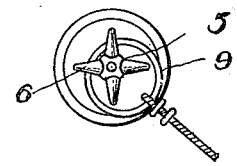

The invention is hereinafter more fully described and illustrated in the accompanying drawings in which Fig. 1 is a side elevation, partly in section, of part of a vessel provided with my invention;

Fig. 2 a plan view of the buoy line guide and grapple engaging means; and

Figure 3:
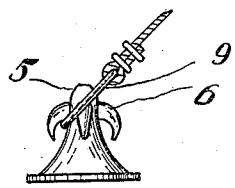

Fig. 3 a side elevation of the same parts with a grapple ring in position.

In Fig. 1 is shown part of a marine vessel. To its deck is secured a reel 1 or other device from which a line 2 may be drawn. One end of the line will be secured to the reel and the other end to a gas buoy 3 of any known automatic type and preferably provided with a pennant 4 to increase its range of visibility by daylight.

The line between the reel and buoy is led through a stout structure 5 secured to the deck of the vessel. This structure has a fairlead at the top through which the line passes and is provided with a sheave 6 round which the line from the reel is led. The structure 5 is preferably of roughly conical form and is provided with a plurality of radially extending arms or projections 6 near its upper end which incline or curve downwardly. The buoy is preferably supported on the mast 7 at a height sufficient to keep it clear of all entangling cordage and is adapted to float clear of its support.

A hook-and-eye device 8 having the hook attached to the mast and facing upwardly will answer the purpose. If the vessel sinks the buoy will float clear at the surface and uncoil the line as the vessel goes down.

When the vessel has been located through the medium of the buoy the salvage crew will slip down over the buoy line one or more grapple rings 9 each secured to a stout cable 10. These rings will be guided by the buoy line and will pass over one or more of the arms 6 and engage under them as shown in Figs. 2 and 3. As the cable 10 is secured to the ring at one side and as the member 5 is of conical form a pull on the cable will with certainty cause the opposite side of the ring to move inwardly and upwardly to a position in engagement with one or more hooks. A connection with the vessel is thus established whereby it may be raised.

In the case of a large vessel a number of these devices may be employed. As the structure 5 must stand great stresses which must be well distributed to the frame of the vessel, it must be well braced to the frame of the vessel as, for example, by the braces and struts 11.

In the case of a submarine which must submerge, provision must be made to release the buoy by hand, as normally it must not be disengageable by flotation.

What I claim is:

1. The combination with a marine vessel of a buoy; a grapple engaging member rigidly secured to and braced from the vessel structure having adjacent its upper end a plurality of outwardly and downwardly directed hooks secured to and extending from its upper end; a line extending from the center of the outer end of said grapple engaging member to said buoy; a grapple ring adapted to slip over said hooks and engage under one or more, the said ring being of an internal diameter greater than the distance of the center of the outer end of the grapple engaging member from the ends of the hooks; and a cable connected to one side of the ring.

2. The combination with a marine vessel of a buoy; a frusto-conical grapple engaging member rigidly secured to and braced from the vessel structure having adjacent its upper end three or more outwardly and downwardly directed hooks secured to and extending from its upper end; a line extending from the center of the outer end said grapple engaging member to said buoy; a grapple ring adapted to slip over said hooks and engage under one or more, the said ring being of an internal diameter greater than the distance of the center of the outer end of the grapple engaging member from the ends of the hooks; and a cable connected to one side of the ring.

3. The combination with a marine vessel of a buoy; a grapple engaging member rigidly secured to and braced from the vessel structure having adjacent its upper end a plurality of outwardly and downwardly curved hooks secured to and extending from its upper end; a line extending from the center of the outer end of said grapple engaging member to said buoy; a grapple ring adapted to slip over said hooks and engage under one or more, the said ring being of an internal diameter greater than the distance of the center of the outer end of the grapple engaging member from the ends of the hooks; and a cable connected to one side of the ring.

4. The combination with a marine vessel of a buoy; a frusto-conical grapple engaging member rigidly secured to and braced from the vessel structure having adjacent its upper end three or more outwardly and downwardly curved hooks secured to and extending from its upper end; a line extending from the center of the outer end of said grapple engaging member to said buoy; a grapple ring adapted to slip over said hooks and engage under one or more, the said ring being of an internal diameter greater than the distance of the center of the outer end of the grapple engaging member from the ends of the hooks; and a cable connected to one side of the ring.

5. The combination with a marine vessel of a buoy; a grapple engaging member rigidly secured to and braced from the vessel structure having adjacent its upper end a plurality of outwardly and downwardly directed hooks secured to and extending from its upper end; a line extending from the center of the outer end of said grapple engaging member to said buoy; a grapple ring adapted to slip over said hooks and engage under one or more, the said ring being of an internal diameter greater than the distance of the center of the outer end of the grapple engaging member from the ends of the hooks; and a cable connected to one side of the ring, the diameter of the ring also being less than that of a circle containing the hooks.

Signed at Toronto, Canada, this 1st day of April, 1926.

JOHN FERGUSON BAINE.